United States Patent [19] | [11] 3,725,806
Darlington | [45] Apr. 3, 1973

[54] DISTORTION REDUCTION IN A REPEATERED TRANSMISSION SYSTEM

[75] Inventor: Sidney Darlington, Durham, N.H.

[73] Assignee: Bell Telephone Laboratories, Incorporated, Murray Hill, Berkeley Heights, N.J.

[22] Filed: June 9, 1972

[21] Appl. No.: 261,519

[52] U.S. Cl. ....................................330/149, 330/151
[51] Int. Cl. ..................................................H03f 1/26
[58] Field of Search ...............330/149, 151; 328/163

[56] References Cited

UNITED STATES PATENTS 2,776,410 1/1957 Guanella ................................333/28

*Primary Examiner*—Roy Lake
*Assistant Examiner*—James B. Mullins
*Attorney*—R. J. Guenther et al.

[57] ABSTRACT

The distortion appearing at the output of a repeater having a non-linear power amplifier with local feedback as an input amplifier stage is substantially reduced by generating a compensating distortion component within an auxiliary network. The auxiliary network attenuates a signal derived from the input amplifier stage and amplifies the attenuated signal with an auxiliary amplifier having substantially the same gain and distortion characteristics as the power amplifier in the input stage. The output of the auxiliary amplifier is attenuated and combined with the output of the input stage to substantially reduce the distortion.

11 Claims, 8 Drawing Figures

DISTORTION REDUCTION IN A REPEATERED TRANSMISSION SYSTEM

BACKGROUND OF THE INVENTION

This invention relates to repeatered transmission systems and, more particularly, to the reduction of the distortion generated by the non-linear power stages of the repeaters.

In wideband coaxial cable systems where the signal must pass through a large number of repeaters between transmitting and receiving terminals, the modulation products generated due to the non-linearity of each repeater play a significant role in the degradation of signal quality. It has been found that whereas even-ordered modulation products tend to add incoherently or cancel over the entire transmission system, the odd-ordered modulation products tend to add coherently through the numerous repeater stages increasing the distortion to levels proportional to 20 log N db, where N is the number of repeaters in the system. It is therefore necessary to keep the distortion introduced by each individual repeater to as low a level as possible.

In the repeaters employed in prior art transmission systems, a distortion component comprising a collection of modulation products at all frequencies is added to the signal being amplified due to the non-linear amplifying characteristic of the output power amplifier. The plurality of linear amplifiers serially connected with the power amplifier in a forward path introduce relatively no distortion of their own. A local feedback network around the serially connected linear amplifiers and power amplifier has tended, for the narrow bandwidths of prior art systems, to suppress the distortion component of the signal at the output of the power amplifier. As bandwidths of modern transmission systems become wider and wider, however, local feedback by itself is insufficient to reduce the distortion to acceptable levels. In wider band systems, therefore, to keep the level of the accumulated distortion as low as possible, further distortion compensation must be employed at either each repeater or at occasional repeaters in the transmission system. Typically, this additional distortion compensation has required either more gain in an additional complex multistage network added to the basic repeater or a correcting network that substantially duplicates the basic repeater.

An object of this invention is to significantly reduce or cancel the distortion introduced by the repeaters in a wideband transmission system.

SUMMARY OF THE INVENTION

The repeater of the present invention employs an auxiliary signal path and a signal combiner in combination with a prior art repeater to obtain either cancellation or a substantial reduction in the distortion introduced by the non-linear characteristics of the prior art power amplifier. The prior art repeater is serially connected with the signal combiner in a main signal path between the input and output terminals of the present repeater. The auxiliary signal path comprises serially connected first attenuator, auxiliary amplifier, and second attenuator and is connected from the prior art repeater to a second input of the signal combiner in the main signal path. The first attenuator reduces the level of the linear component of the input signal to the auxiliary path to the level of the linear component of the input signal to the power amplifier of the prior art repeater; the auxiliary amplifier has substantially the same gain and distortion characteristic as this prior art power amplifier and provides an output signal with a distortion component greater than the distortion component of the signal at the output of the prior art power amplifier; and the second attenuator reduces this auxiliary path distortion component to a level approximately that of the distortion component of the output signal from the prior art power amplifier. (The output signal of the auxiliary amplifier has a distortion component greater than the distortion component of the signal at the output of the prior art power amplifier since feedback does not reduce the distortion generated by the auxiliary amplifier as it does reduce the distortion generated by the power amplifier.) The distortion components of the signals in the main and auxiliary paths are then fed to the signal combiner where they are cancelled, the output of the signal combiner being a substantially distortion-free amplified replica of the linear component of the input signal. As discussed in detail hereinafter, an additional signal combiner may be serially connected in the auxiliary path and to the main path to eliminate the linear component of the signal in the auxiliary path.

DETAILED DESCRIPTION

Figure 1:
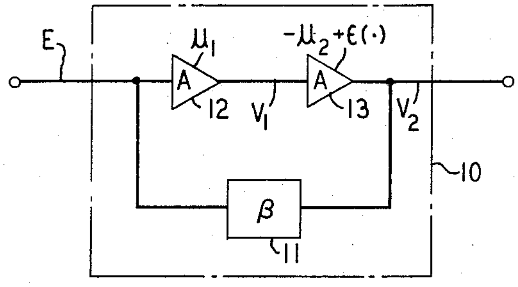
FIG. 1 PRIOR ART
FIG. 1 is a block diagram of a prior art repeater network with local feedback and a power amplifier that introduces distortion in the forward path.

FIG. 1 illustrates a prior art distortion producing repeater 10 in the form of a two port amplifier with a $\beta$ or local feedback network 11 connected from its output terminal to its input terminal. Linear amplifier 12 is serially connected with distortion producing non-linear power amplifier 13 in a forward path interconnecting the input and output terminals of repeater 10. Although amplifier 12 is symbolically shown as a single linear stage this stage would normally comprise a plurality of serially connected linear amplifier stages. For present illustrative purposes, however, it is sufficient to treat this linear stage as a single amplifier 12 having an overall gain factor $\mu_1$, as noted in the drawing. Amplifier 13 is normally a single stage and provides power amplification. This power amplifier stage is relatively non-linear compared to linear amplifier 12. The gain of the power amplifier is assumed, for present illustrative purposes, to be $-\mu_2 + \epsilon(.)$, as shown in the drawing, where $-\mu_2$ is the gain of the amplifier 13 and the term $\epsilon(.)$ is a functional representation of the summations of the modulation products at all frequencies, i.e., the distortion introduced due to the non-linearity of the power amplifier 13. The compensating feedback introduced by the feedback network 11 in an effort to reduce distortion does not provide a satisfactory degree of distortion reduction in modern wideband transmission systems.

Figure 2:
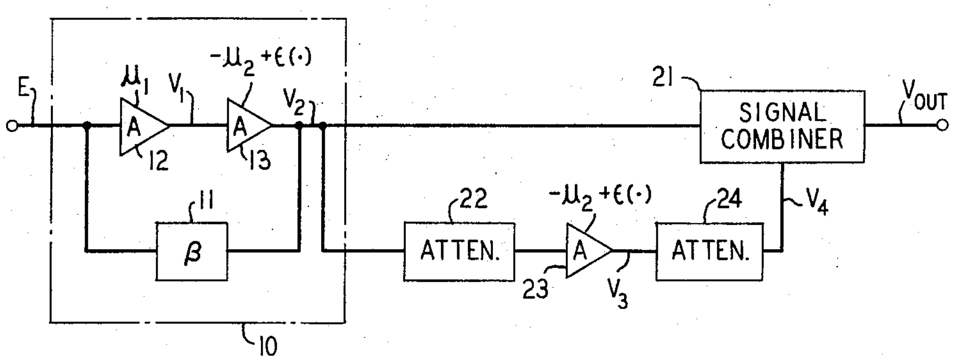
FIG. 2 is a block diagram of an embodiment of the present invention where distortion cancellation is obtained by combining the output of the prior art repeater with the output of the auxiliary network connected to the output of the prior art repeater.

The present invention, one embodiment of which is illustrated in FIG. 2, rather than relying solely on feedback to compensate for this distortion instead supplements the feedback compensation with feedforward circuitry which cancels the distortion appearing at the output of the repeater 10. In the circuit of FIG. 2, the prior art feedback amplifier 10 illustrated in FIG. 1 is employed as an input or main amplifying stage. The output of the power amplifier 13 is connected to one input of signal combiner 21 in a main signal path with the output of the signal combiner 21 being connected to the output of the repeater. An auxiliary signal path comprising serially connected attenuator 22, amplifier 23 and attenuator 24 is connected from the output of power amplifier 13 to a second input of the signal combiner 21 to provide distortion cancellation, as discussed in detail hereinafter. As shown in FIG. 2 of the drawing, the linear and non-linear characteristics of amplifier 23 are chosen to be substantially equal to the linear and non-linear characteristics of amplifier 13.

In the embodiment of the invention illustrated in FIG. 2, the linear and distortion components of the signal $V_2$ at the output of the amplifier 13 are fed to the attenuator 22. The attenuation factor of attenuator 22, which may be a passive network whose transfer characteristic is a function of frequency, is chosen to reduce the level of the linear component of the signal $V_2$ to approximately the level of the linear component of the signal $V_1$. (Signal $V_1$ also includes a distortion component due to the feedback via feedback network 11.) The distortion component of the signal at the output of attenuator 22 is also reduced by the same attenuation factor as is the linear component of this signal.

As noted heretofore, linear and non-linear characteristics of amplifier 23 are chosen to be equal to the linear and non-linear characteristics of amplifier 13. Since the linear components of the input signals to amplifiers are substantially identical, the output signal $V_3$ from amplifier 23 will have a linear component substantially identical to the linear component of the output signal $V_2$ from amplifier 13. However, since feedback does not reduce the distortion component generated due to the non-linearity of amplifier 23, as feedback does reduce the distortion component generated by amplifier 13, the distortion component generated by amplifier 23 is greater than the distortion component of the output signal $V_2$ from amplifier 13. The distortion component of signal $V_3$ is comprised of the attenuated and amplified distortion component of signal $V_2$ and the distortion component generated due to the non-linearity of amplifier 23. Since the distortion component of signal $V_3$ is greater than the distortion component of signal $V_2$, signal $V_3$ is fed to an attenuator 24, which may also be a passive network whose transfer characteristic is a function of frequency. Unlike the attenuation factor of attenuator 22, which is chosen to reduce the magnitude of the linear component of the signal $V_2$, the attenuation factor of attenuator 24 is chosen to reduce the magnitude of the distortion component of the signal $V_3$. The output signal $V_4$ from attenuator 24 thus has a linear component smaller than the linear component of the output signal of amplifier 13 and a distortion component that has been attenuated to a level approximately that of the level of the distortion component appearing at the output of amplifier 13.

The input signals to the signal combiner 21 are thus the output signal $V_2$ from the amplifier 13 of the main signal path and the output signal $V_4$ from the attenuator 24 in the auxiliary signal path. As noted, the distortion components of these signals are at levels which are approximately equal, and these components are substantially cancelled in the signal combiner 21. The output of the signal combiner 21 is thus only a combination of the linear components of the signals $V_2$ and $V_4$ and is substantially free of distortion.

Attenuators 22 and 24 may be any one of a large number of compatible frequency dependent networks well known in the art. Attenuators 22 and 24 may be, for example, passive networks having given frequency dependent transfer characteristics and gain less than one. Such networks may be easily realized by techniques now well known in the art such as the networks shown by U.S. Pat. No. 1,603,305 issued to O. J. Zobel on Oct. 19, 1926. In terms of the gain factor $\mu_2$ of the amplifier 13, the attenuation factor of attenuator 22 would be $1/\mu_2$. Similarly, in terms of the gain factors $\mu_1$ and $\mu_2$ of amplifiers 12 and 13 and $\beta$ of feedback network 11, the attenuation factor of attenuator 24 would be $1/2+\mu_1\mu_2\beta$. Signal combiner 21 could be any one of a large number of compatible networks such as, for example, a hybrid coil arrangement. As in the case of amplifiers 12 and 13, amplifier 23 would comprise either a single transistor stage or a plurality of transistor stages.

It should be noted that amplifier 23 is substantially identical to the distortion producing power amplifier 13 in the main amplifying stage 10. Since the auxiliary amplifier duplicates only that part of the forward path of the input stage that produces distortion and not the entire forward path, a savings is realized over the prior art schemes which duplicate the entire forward path.

Figure 3:
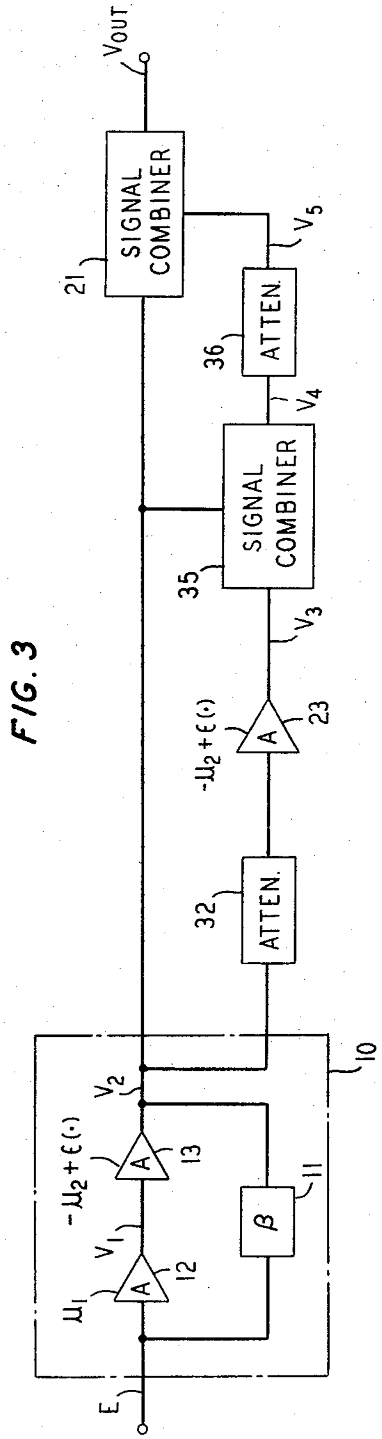
FIG. 3 is a modification of FIG. 2 where linear signal cancellation is performed in the auxiliary network prior to distortion cancellation.

In the embodiment of the present invention shown in FIG. 3, distortion cancellation is also accomplished with an auxiliary signal path comprising attenuator 32, amplifier 23, one input and the output of signal combiner 35 and attenuator 36 serially connected from the output of power amplifier 13 to a second input of signal combiner 21. As in the embodiment of the invention illustrated in FIG. 2, the prior art feedback amplifier 10 is employed as an input or first stage. The output of power amplifier 13 is connected to an input of signal combiner 21 in a main signal path with the output of the signal combiner 21 being connected to the output of the repeater. The output of power amplifier 13 is also connected to a second input of signal combiner 35 to provide signal cancellation in the auxiliary signal path prior to distortion cancellation, as discussed in detail hereinafter. As was the case for the embodiment of the invention shown in FIG. 2, the linear and non-linear characteristics of amplifier 23 are chosen to be substantially equal to the linear and non-linear characteristics of amplifier 13.

In the embodiment of the invention illustrated in FIG. 3, the linear and distortion components of the signal $V_2$ at the output of amplifier 13 are fed to attenuator 32. Attenuator 32, which may be a passive network having a frequency dependent transfer characteristic, is chosen to have an attenuation factor sufficient to reduce the level of the linear component of the signal $V_2$ to approximately the level of the linear component of the signal $V_1$. As discussed heretofore in connection with the embodiment of the invention illustrated in FIG. 2, the linear component of the output signal $V_3$ from amplifier 23 is substantially identical to the linear component of signal $V_2$. As also previously discussed, the distortion component of signal $V_3$ is greater than the distortion component of the signal $V_2$. The input signals to signal combiner 35 are output signal $V_2$ from amplifier 13 and output signal $V_3$ from amplifier 23. As noted, signals $V_2$ and $V_3$ have linear components that are at levels that are approximately equal. Thus when signals $V_2$ and $V_3$ are combined, the linear components substantially cancel and the resultant output signal $V_4$ is a combination of distortion components. The level of the distortion signal $V_4$ is greater than the level of the distortion component of signal $V_2$. The output signal $V_4$ from signal combiner 35 is fed to attenuator 36, which may also be a frequency dependent passive network. Attenuator 36 is chosen to reduce the magnitude of signal $V_4$ to a level approximately that of distortion component of signal $V_2$. The output signal $V_5$ of attenuator 36 is almost exclusively a distortion component at approximately the same level as the distortion component in the main signal path.

The input signals to signal combiner 21 are thus the output signal $V_2$ from amplifier 13 in the main signal path and the output signal $V_5$ from attenuator 36 in the auxiliary signal path. As noted, the distortion components of signals $V_2$ and $V_5$ are at levels which are approximately equal and these components are substnatially cancelled in the signal combiner 21. The output of signal combiner 21 is thus the linear component of signal $V_2$ and is substantially free of distortion. Thus, the output of the repeater is substantially that which would have been obtained if the power amplifier stage 13 did not introduce a distortion component.

As heretofore described, attenuators 32 and 36 may be passive networks whose transfer characteristic is a function of frequency. In terms of the gain factors $\mu_1$ and $\mu_2$ of amplifiers 12 and 13 and $\beta$ of feedback network 11, the attenuation factors of attenuators 32 and 36 would be $1/\mu_2$ and $1/1+\mu_1\mu_2\beta$, respectively. Signal combiners 21 and 35 could each be any one of a large number of compatible networks such as, for example, a hybrid coil arrangement.

Figure 4:
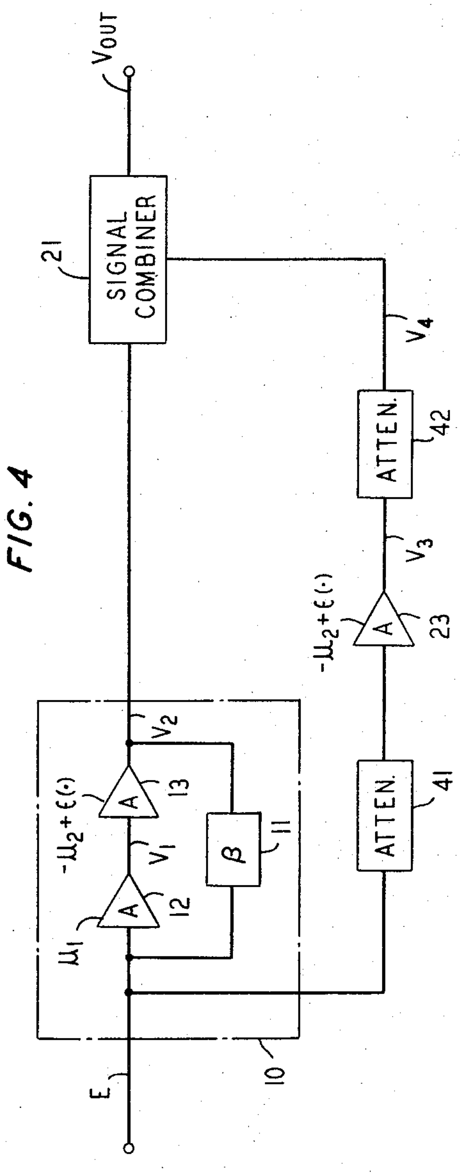
FIG. 4 is a block diagram of an embodiment of the present invention where distortion cancellation is obtained by combining the output of the prior art repeater with the output of an auxiliary network connected to the input of the prior art repeater.

In the embodiment of the present invention shown in FIG. 4, distortion cancellation is also accomplished with an auxiliary signal path comprising attenuator 41, amplifier 23 and attenuator 42 serially connected from the input of feedback amplifier 10 to the second input of signal combiner 21. As in the heretofore described embodiments of this invention, the prior art feedback amplifier 10 is employed as an input or first stage. The output of power amplifier 13 is connected to the first input of signal combiner 21 in the main signal path with the output of the signal combiner 21 being connected to the output of the repeater. As heretofore discussed, the linear and non-linear characteristics of amplifier 23 are chosen to be substantially equal to the linear and non-linear characteristics of amplifier 13.

As illustrated in FIG. 4, the input signal E is fed to attenuator 41. The attenuation factor of attenuator 41 which may be, as in previous embodiments, a passive network whose transfer characteristic varies as a function of frequency, is chosen to reduce the linear component of the input signal E to approximately the level of the linear component of signal $V_1$. The linear component of the output signal $V_3$ of amplifier 23 is again substantially equal to the linear component of signal $V_2$ at the output of amplifier 13. The distortion component of signal $V_3$ is generated due to the non-linearity of amplifier 23 and is greater than the distortion component of signal $V_2$. The output of amplifier 23 is fed to attenuator 42 whose attenuation factor is chosen to reduce the distortion component of signal $V_3$ to approximately the same level as the distortion component of signal $V_2$.

The input signals to the signal combiner 21 are thus the output signal $V_2$ from amplifier 13 in the main signal path and the output signal $V_4$ from attenuator 42 in the auxiliary signal path. As noted, the distortion components of these signals are at levels which are approximately equal and these components are substantially cancelled in the signal combiner 21. The output of signal combiner 21 is thus only a combination of the linear components of the signal $V_2$ and $V_4$ and is substantially free of distortion.

As heretofore described, attenuators 41 and 42 may be any passive network whose transfer characteristic serves as a function of frequency. In terms of the gain factors $\mu_1$ and $\mu_2$ of amplifiers 12 and 13 and $\beta$ of feedback network 11, the attenuation factors of attenuators 41 and 42 are given by the expressions $\mu_1/1+\mu_1\mu_2\beta$ and $1/1+\mu_1\mu_2\beta$ respectively, where the absolute value of the attenuation factors must be less than one to meet the passivity requirement. Signal combiner 21 could be any of a large number of compatible networks such as, for example, a hybrid coil arrangement.

Figure 5:
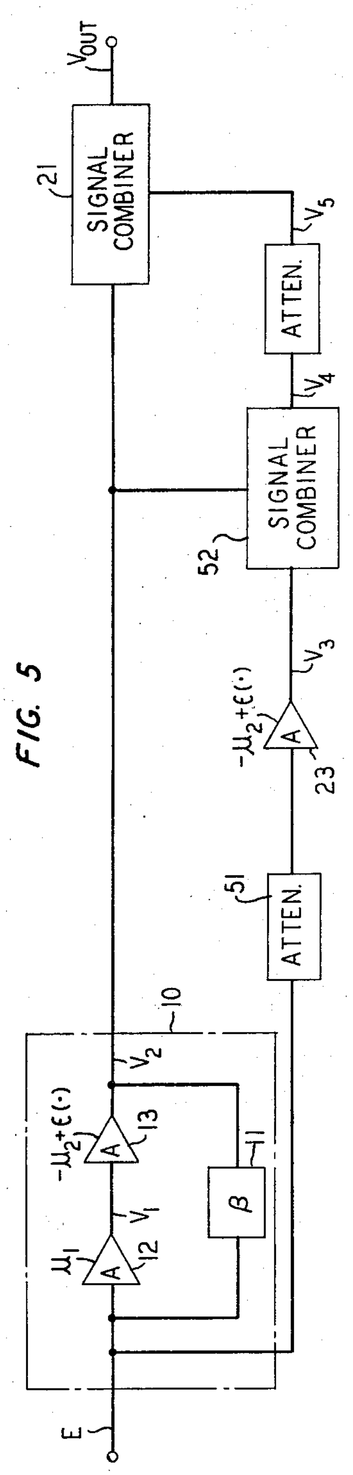
FIG. 5 is a modification of FIG. 4 where linear signal cancellation is performed in the auxiliary network prior to distortion cancellation.

FIG. 5 illustrates an embodiment of this invention where, as in the embodiment illustrated in FIG. 3 heretofore discussed, signal cancellation of the linear component of the signal is performed in the auxiliary signal path prior to the cancellation of the distortion component of the signal in the main signal path. The auxiliary signal path comprises attenuator 51, amplifier 23, one input and the output of signal combiner 52 and attenuator 53 serially connected from the input of feedback amplifier 10 to a second input of signal combiner 21. The output of signal combiner 52 is connected to the input of attenuator 53 whose output is connected to the second input of signal combiner 21.

As in the previously discussed embodiments of the present invention, the prior art feedback amplifier 10 is employed as an input or first stage in the circuit of FIG. 5. The output of power amplifier 13 is connected to a first input of signal combiner 21 in a main signal path with the output of signal combiner 21 being connected to the output of the repeater. The output of power amplifier 13 is also connected to a second input of signal combiner 52 to provide signal cancellation in the auxiliary signal path prior to distortion cancellation. The linear and non-linear characteristics of amplifier 23 are again chosen to be substantially equal to the linear and non-linear characteristics of amplifier 13.

As illustrated in FIG. 5, the linear input signal E is fed to attenuator 51 which may be a frequency dependent passive network having an attenuation factor which reduces the input signal E to approximately the level of the linear component of the signal $V_1$. The linear component of the output signal $V_3$ from amplifier 23 is substantially identical to the linear component of signal $V_2$ at the output of power amplifier 13. The distortion component of signal $V_3$ is greater than the distortion component of the signal $V_2$. The input signals $V_2$ and $V_3$ to signal combiner 52 have, as noted, linear components that are approximately equal. Thus when signal $V_2$ and $V_3$ are combined, the linear components cancel and the resultant output signal $V_4$ is a combination of distortion components. The level of the distortion signal $V_4$ is greater than the level of the distortion component of signal $V_2$ at the output of power amplifier 13. Distortion signal $V_4$ is fed to attenuator 53 whose attenuation factor iS chosen to reduce the magnitude of the distortion signal $V_4$ to a level approximately that of the distortion component of signal $V_2$. The output signal $V_5$ of attenuator 53 is almost exclusively a distortion component at approximately the same level as the distortion component in the main signal path.

The input signals to signal combiner 21 are thus the output signal $V_2$ from power amplifier 13 in the main signal path and the output signal $V_5$ from attenuator 53 in auxiliary signal path. The distortion components of signals $V_2$ and $V_5$ are at levels which are approximately equal and the distortion components are substantially cancelled in signal combiner 21. The output of signal combiner 21 is thus the linear component of signal $V_2$ and is substantially free of distortion.

Attenuators 51 and 53 may be passive networks whose transfer characteristic varies as a function of frequency. In terms of the gain factors $\mu_1$ and $\mu_2$ of amplifiers 12 and 13 and $\beta$ of feedback network 11, the attenuation factors of attenuators 51 and 53 would be $\mu_1/1+\alpha\mu_1\mu_2\beta$ and $1/\mu_1\mu_2\beta$, respectively, where the absolute value of the attenuation factors must be less than one to meet the passivity requirement. Signal combiners 21 and 52 could each be any one of a large number of compatible networks such as, for example, a hybrid coil arrangement.

Figure 6:
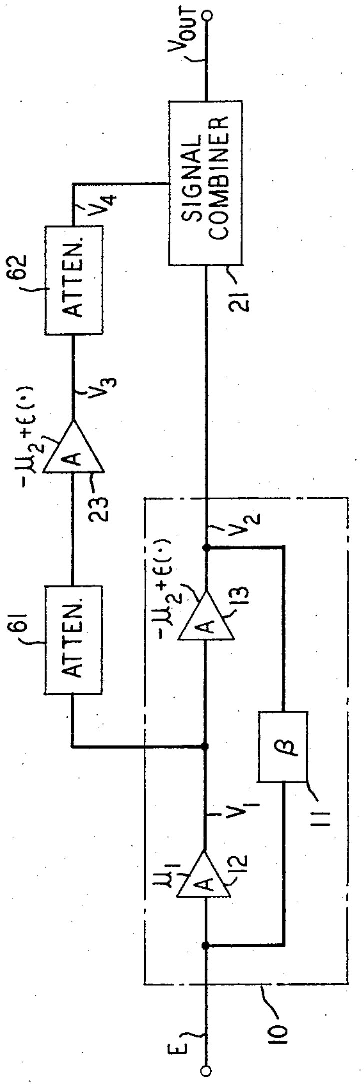
FIG. 6 is a block diagram of an embodiment of the present invention where distortion cancellation is obtained by combining the output of the prior art repeater with the output of an auxiliary network connected to the input of the power amplifier in the prior art repeater.

In the circuit of FIG. 6, distortion cancellation is accomplished with an auxiliary signal path comprising attenuator 61, amplifier 23 and attenuator 62 serially connected from the output of linear amplifier 12 to a second input of signal combiner 21. Feedback amplifier 10 is again employed as an input or first stage. The output of power amplifier 13 is connected to a first input of signal combiner 21 in a main signal path with the output of signal combiner 21 being connected to the output of the repeater. The linear and non-linear characteristics of amplifier 23 are again chosen to be substantially equal to the linear and non-linear characteristics of amplifier 13.

In the embodiments of this invention heretofore discussed, the linear component of the signal coupled from feedback amplifier 10 to the auxiliary signal path has first been attenuated to a level approximately equal to the linear component of $V_1$. In the embodiment of FIG. 6, signal $V_1$ is itself derived from feedback amplifier 10. If signal $V_1$ was coupled directly to the input of amplifier 23, the output signal $V_3$ of amplifier 23 would have a linear component and a distortion component equal to the linear and distortion components of signal $V_2$ at the output of power amplifier 13. The equivalence of signal $V_2$ and $V_3$ would result in unwanted signal cancellation. To achieve distortion cancellation without signal cancellation, the distortion component of the output signal of amplifier 23 must be increased relative to the linear component. Therefore, for purposes of this embodiment of the invention, amplifiers 13 and 23 will be chosen to have linear amplifying characteristics that obey a scaling law. In other words, amplifiers 13 and 23 would be chosen so that an input signal V yields an output signal having linear component $-\mu_2 V$ and non-linear component $\epsilon(V)$, then for a predetermined scaling law, an input signal $rV$, where $r$ is any real constant, will yield an output signal having a linear component $-\mu_2 rV$ and non-linear component $r^n\epsilon(V)$, where $n$ is a number corresponding to the order of the dominant modulating product in the distortion component of the signal. It is further assumed that the $n^{th}$ odd order modulation products are significant in contributing to the distortion component.

As illustrated in FIG. 6, the linear and distortion components of signal $V_1$ are fed to attenuator 61. Attenuator 61 is chosen so as to reduce the level of the linear component of the signal $V_1$ by a constant factor which is independent of frequency. The linear component of the output signal $V_3$ from amplifier 23 is equal to the linear component of signal $V_2$ reduced by the attenuation factor of attenuator 61. The distortion component of signal $V_3$ is comprised of the distortion generated by the non-linearity of amplifier 23 as a function of its input signal and the distortion component of signal $V_1$ that has been attenuated by attenuator 61 and amplified by amplifier 23. The output of amplifier 23 is fed to attenuator 62. The attenuation factor of attenuator 62 is chosen to reduce the distortion component of signal $V_3$ to approximately the same level as the distortion component of signal $V_2$.

As in the embodiments heretofore discussed, the input signals $V_2$ and $V_4$ to signal combiner 21 have distortion components that are approximately equal and substantially cancelled in the combiner 21. The output of signal combiner 21 is thus a combination of the linear components of the signals $V_2$ and $V_4$ and is substantially free of distortion.

Attenuator 61 may be a passive network having a substantially constant transfer characteristic over the useful frequency bandwidth. The attenuation factor may be expressed as $1/k$ where $k$ is greater than 1 and chosen in accordance with the specific application for which the circuit is intended. In terms of the gain factor $\mu_1$ and $\mu_2$ of amplifiers 12 and 13, $\beta$ of feedback network 11, and the attenuation factor $1/k$ of attenuator 61, the attenuation factor of attenuator 62 would be given by $k^3/1+\mu_1\mu_2\beta(1-k^2)$ where third order products are dominant. Signal combiner 21 could be any one of a large number of compatible networks such as, for example, a hybrid coil arrangement.

Figure 7:
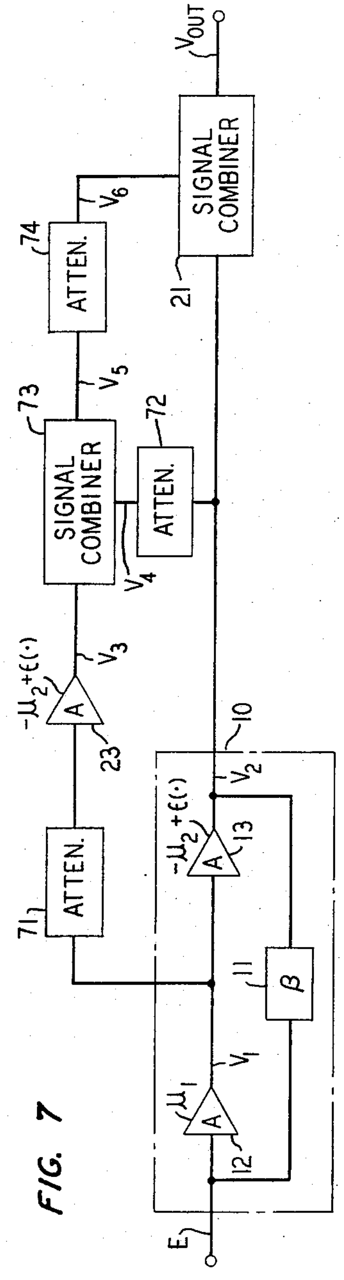
FIG. 7 is a modification of FIG. 6 where linear signal cancellation is performed in the auxiliary network prior to distortion cancellation.

FIG. 7 illustrates an embodiment of this invention in which the network illustrated in FIG. 6 is modified to obtain signal cancellation in the auxiliary signal path. The auxiliary signal path comprises attenuator 71, amplifier 23, one input and the output of signal combiner 73 and attenuator 74 serially connected from the output of amplifier 12 to a second input of signal combiner 21. Feedback amplifier 10 is employed as a first or input stage. The output of power amplifier 13 is connected to a first input of signal combiner 21 in a main signal path with the output of signal combiner 21 being connected to the output of the repeater. The output of power amplifier 13 is also connected to the input of attenuator 72 whose output is connected to a second input of signal combiner 73 to provide signal cancellation in an auxiliary signal path prior to distortion cancellation. The linear and non-linear characteristics of amplifier 23 are chosen to be substantially equal to the linear and non-linear characteristics of amplifier 13.

Amplifiers 13 and 23 in the embodiment of FIG. 7 will, as in the embodiment of FIG. 6, also be operated at different input levels and obey a scaling law, such as, for example, the scaling law noted heretofore in connection with the discussion of FIG. 6. The linear and non-linear components of signal $V_1$ are fed to attenuator 71. Attenuator 71 is chosen to have a frequency independent attenuation factor that reduces the level of the linear component of the signal $V_1$ by a constant factor. Since the gains of amplifiers 13 and 23 are approximately equal, the linear component of the output signal $V_3$ from amplifier 23 is approximately equal to the linear component of signal $V_2$ reduced by the attenuation factor of attenuator 71. The attenuation factor of attenuator 72 is chosen to reduce the linear component of signal $V_2$ to a level substantially equal to the linear component of signal $V_3$. The input signals $V_3$ and $V_4$ to signal combiner 73, therefore, have linear components that are approximately equal and are substantially cancelled in signal combiner 73. The resultant output distortion signal $V_5$ from signal combiner 73 is fed to attenuator 74. Attenuator 74 is chosen to reduce the magnitude of distortion signal $V_5$ to a level approximately that of the distortion component of signal $V_2$. The output signal $V_6$ of attenuator 74 is thus almost exclusively distortion at substantially the same level as the distortion component of the signal $V_2$ in the main signal path.

The input signals to signal combiner 21 are thus the output signal $V_2$ from amplifier 13 in the main signal path and the output signal $V_6$ from attenuator 74 in the auxiliary signal path. The distortion components of signals $V_2$ and $V_6$ are at levels which are approximately equal and these components are substantially cancelled in signal combiner 21. The output of signal combiner 21 is thus the linear component of signal $V_2$ and is relatively free of distortion.

Attenuators 71 and 72 may each be a passive network having a constant transfer characteristic over the useful frequency bandwidth. The attenuation factor of each network may be expressed as $1/k$ where $k$ is greater than 1. In terms of the gain factors $\mu_1$ and $\mu_2$ of amplifiers 12 and 13, $\beta$ feedback network 11, and $k$ of attenuators 71 and 72, the attenuation factor of attenuator 74 is given by $k^3/(1-k^2)(1+\mu_1\mu_2\beta)$ when third order modulation products are dominant. Signal combiners 21 and 73 could each be any one of a large number of compatible networks such as, for example, a hybrid coil arrangement.

It has been heretofore assumed that the output distortion components generated by amplifiers 13 and 23 were functionally related to their input linear components by $\epsilon(.)$. However, if amplifier 23 generated a different distortion component, represented by $\hat{\epsilon}(.)$, then the output of signal combiner 21, in each of the embodiments, would have a distortion component determined by the difference between $\epsilon(.)$ and $\hat{\epsilon}(.)$. The distortion components $\epsilon(.)$ and $\hat{\epsilon}(.)$ can be regarded as the sum of the modulation products. If the non-linear transistors in amplifiers 13 and 23 are drawn independently from the same population, it can be shown that the average of the difference of each of the $\epsilon(.)$ and $\hat{\epsilon}(.)$ modulation products would be zero at the output of signal combiner 21. Thus, the distortion from N compensated repeaters serially connected in a transmission system will increase incoherently as 10 log N db rather than a coherent accumulation of 20 log N db that would result without the distortion compensating network.

Distortion compensation has heretofore been assumed to occur at every repeater in the transmission path. The teachings of the present invention can also be applied to a system where distortion is accumulated through the passage of a number of uncompensated repeaters and then overcompensated at every $N_r$th repeater in the transmission path. Therefore, at every $N_r$th repeater, $N_r$ times the distortion generated in the $N_r$th repeater is removed from the main signal path. The embodiments of this invention illustrated in FIGS. 3, 5 and 7 could be easily modified simply by changing the attenuation factors of attenuators 36, 53 and 74 to produce a distortion component in the auxiliary signal path that will compensate for the distortion present in the main signal path that has accumulated through $N_r$ repeaters. For example, the attenuation factors of attenuators 36, 53 and 74 could be modified to $N_r/1+\mu_1\mu_2\beta$, $N_r/\mu_1\mu_2\beta$ and $N_r k^3/(1-k^2)(1+\mu_1\mu_2\beta)$, respectively. In this distortion overcompensating network at every $N_r$th repeater, the remaining network elements, would be as heretofore described for the respective embodiments of this invention.

In such overcompensation arrangements, distortion cancellation is achieved when the non-linear amplifying stages used in the overcompensating subcircuits are substantially identical to the non-linear amplifying stages used in each uncompensated repeater feedback network 10 as illustrated in FIG. 1. In the absence of identical non-linear stages, total distortion cancellation will not be achieved but distortion reduction can be obtained. The teachings of this invention can also be applied to a system where an auxiliary non-linear network having desired properties is synthesized from linear circuits and a given non-linear circuit.

Figure 8:
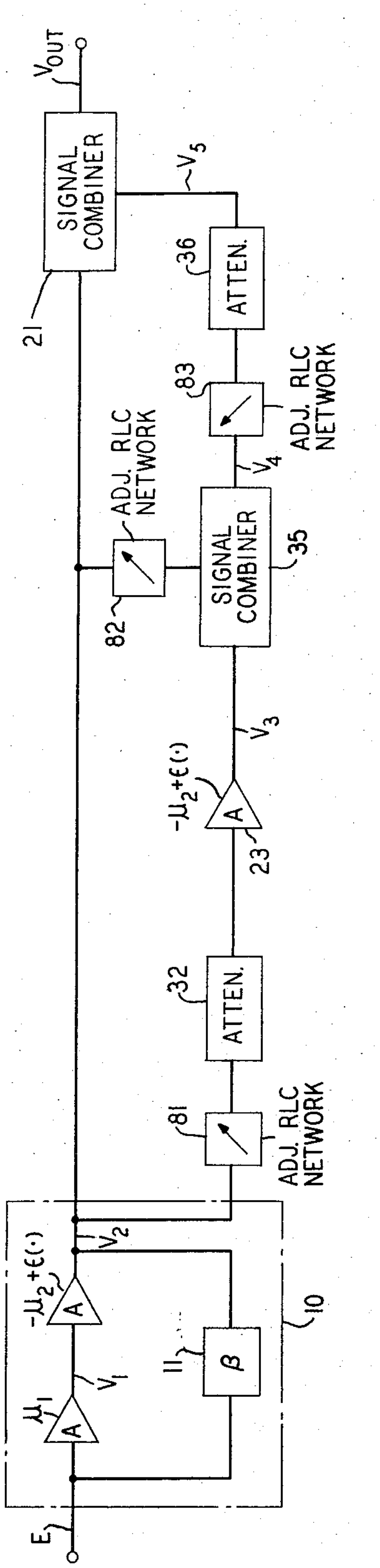
FIG. 8 is a modification of FIG. 3 where the cancelling distortion in the auxiliary signal path is premultipled and post-multiplied by the frequency dependent transmission characteristics of RLC adjustable networks.

In the repeater illustrated in FIG. 8, greater distortion overcompensation is achieved by modifying the structure of FIG. 3. In FIG. 8, an adjustable RLC network 81 is connected between the output of power amplifier 13 and the input of attenuator 32 of FIG. 3. A second adjustable RLC network 82 is connected between the output of power amplifier 13 and the second input of signal combiner 35 of FIG. 3. A third adjustable RLC network is connected between the output of signal combiner 35 and the input of attenuator 36 of FIG. 3. Feedback amplifier 10, attenuator 32, amplifier 23 and signal combiners 21 and 35 are as heretofore discussed in connection with FIG. 3. Attenuator 36 has an attenuation factor $N_r/1+\mu_1\mu_2\beta$ to compensate for the distortion accumulated in the main signal path from the previous uncompensated repeaters.

Adjustable RLC networks 81, 82 and 83 may be any compatible networks such as Bode attenuation equalizers of the type disclosed by U.S. Pat. No. 2,096,027, to H. W. Bode, issued Oct. 19, 1937. Networks 81 and 82 each have a transfer characteristic T1 which varies as a function of frequency. The distortion signal $V_4$ generated by the non-linearity of amplifier 23 is thus pre-attenuated by the transfer characteristic T1. Network 83 is adjusted to have a transfer characteristic T2, which varies as a function of frequency, to post-attenuate the distortion component generated by amplifier 23. The transfer characteristics T1 and T2 modify the distortion component generated by amplifier 23 to more closely match the diStortion component in the main signal path and effect a high degree of cancellation. Thus, the overcompensating distortion component that ideally will equal $N_r$ times the distortion produced in one repeater can be modified to more closely resemble the accumulated distortion and account for deviations due to the nonuniformity of the non-linear amplifiers and other effects such as imperfect addition of the distortion generated by uncompensated repeaters. Adjustment of RLC networks 81, 82 and 83 would be based on the accumulated distortion component in the main signal path and would functionally modify the signal in the auxiliary signal path to effect a greater degree of distortion compensation.

Various other modifications of this invention can be made without departing from the spirit and scope of the present invention. For example, a delay may be introduced in the main signal path or the auxiliary signal path to adjust the synchronization of the signals prior to being combined that may be necessary due to the inherent delay of the amplifiers.

The above described arrangements are illustrative of the application of the principles of the invention. Other embodiments may be devised by those skilled in the art without departing from the spirit and scope thereof.

What is claimed is:

1. A repeatered transmission system having at least one repeater which comprises an input amplifier stage with local feedback that introduces signal distortion due to the non-linearity of the amplifier in said input amplifier stage, a signal combiner serially connected with said input amplifier stage between the input and output of said repeater, an auxiliary non-linear amplifier having substantially the same gain and distortion characteristics as said amplifier in said amplifier input stage, first and second attenuators, and an auxiliary signal path serially connecting said first attenuator, said auxiliary amplifier, and said second attenuator from said input amplifier stage to said signal combiner, said first attenuator in said auxiliary signal path having an attenuation characteristic which attenuates at least the linear component of the signal derived from said input amplifier stage to a level proportional to the level of the linear component of the input signal to said amplifier in said amplifier input stage, said second attenuator in said auxiliary signal path having an attenuation characteristic which attenuates at least the distortion component of the output signal from said auxiliary amplifier to a level approximately that of the level of the accumulated distortion component of the signal at the output of said input amplifier stage, whereby the distortion introduced due to the non-linearity of said amplifier in said input amplifier stage is substantially reduced by feedforward cancellation.

2. A repeatered transmission system in accordance with claim 1 wherein said input amplifier comprises a linear signal amplifier and a relatively non-linear power amplifier serially connected between the input and output of said input amplifier and said local feedback network is connected from the output of said non-linear amplifier to the input of said linear amplifier, said auxiliary signal path in said at least one repeater comprising said serially connected first attenuator, said auxiliary amplifier, and said second attenuator being connected from the output of said non-linear amplifier in said input amplifier stage to said signal combiner.

3. A repeatered transmission system in accordance with claim 2 wherein said auxiliary signal path in said at least one repeater comprises a second signal combiner having first and second inputs and an output, the first input and the output of said second signal combiner being serially connected between the output of said auxiliary amplifier and the input to said second attenuator in said auxiliary signal path, the second input to said second combiner being connected to the output of said input amplifier, whereby the linear signal components in said auxiliary signal path are substantially cancelled in said second signal combiner.

4. A repeatered transmission system in accordance with claim 3 wherein the attenuation factor of said second attenuator is chosen such that said at least one repeater compensates for the distortion accumulated from previous uncompensated repeaters in said repeatered transmission system.

5. A repeatered transmission system in accordance with claim 1 wherein said input amplifier comprises a linear signal amplifier and a relatively non-linear power amplifier serially connected between the input and output of said input amplifier and said local feedback network is connected from the output of said non-linear amplifier to the input of said linear amplifier, said auxiliary signal path in said at least one repeater comprising said serially connected first attenuator, said auxiliary amplifier, and said second attenuator being connected from the output of said linear amplifier in said input amplifier stage to said signal combiner.

6. A repeatered transmission system in accordance with claim 5 wherein said auxiliary signal path in said at least one repeater comprises a second signal combiner having first and second inputs and an output, the first input and the output of said second signal combiner being serially connected between the output of said auxiliary amplifier and the input to said second attenuator in said auxiliary signal path, the second input to said second combiner being connected to the output of said input amplifier, whereby the linear signal components in said auxiliary signal path are substantially cancelled in said second signal combiner.

7. A repeatered transmission system in accordance with claim 6 wherein the attenuation factor of said second attenuator is chosen such that said at least one repeater compensates for the distortion accumulated from previous uncompensated repeaters in said repeatered transmission system.

8. A repeatered transmission system in accordance with claim 1 wherein said input amplifier comprises a linear signal amplifier and a relatively non-linear power amplifier serially connected between the input and output of said input amplifier and said local feedback network is connected from the output of said non-linear amplifier to the input of said linear amplifier, said auxiliary signal path in said at least one repeater comprising said serially connected first attenuator, said auxiliary amplifier, and said second attenuator being connected from the input of said input amplifier stage to said signal combiner.

9. A repeatered transmission system in accordance with claim 8 wherein said auxiliary signal path in said at least one repeater comprises a second signal combiner having first and second inputs and an output, the first input and the output of said second signal combiner being serially connected between the output of said auxiliary amplifier and the input to said second attenuator in said auxiliary signal path, the second input to said second combiner being connected to the output of said input amplifier, whereby the linear signal components in said auxiliary signal path are substantially cancelled in said second signal combiner.

10. A repeatered transmission system in accordance with claim 9 wherein the attenuation factor of said second attenuator is chosen such that said at least one repeater compensates for the distortion accumulated from previous uncompensated repeaters in said repeatered transmission system.

11. A repeatered transmission system having at least one repeater which comprises an input amplifier stage with local feedback that introduces signal distortion due to the non-linearity of the amplifier in said input amplifier stage, a first signal combiner serially connected with said input amplifier stage between the input and output of said repeater, an auxiliary nonlinear amplifier having substantially the same gain as said amplifier in said amplifier input stage and a distortion characteristic similar to the distortion characteristic of said amplifier in said amplifier input stage, first and second attenuators, first, second and third adjustable RLC networks, a second signal combiner, an auxiliary signal path serially connecting said first RLC network, said first attenuator, said auxiliary amplifier said second signal combiner, said second RLC network and said second attenuator from said input amplifier stage to said first signal combiner, means connecting said third RLC network between the output of said amplifier in said input amplifier stage and said second signal combiner, said first attenuator in said auxiliary signal path having an attenuation characteristic which attenuates at least the linear component of the signal derived from said input amplifier stage to a level proportional to the linear component of the input signal to said amplifier in said amplifier input stage, said second attenuator in said auxiliary signal path having an attenuation characteristic which attenuates at least the distortion component of the output signal from said auxiliary amplifier to a level approximately that of the level of the accumulated distortion component of the signal at the output of said input amplifier stage, said first, second, and third RLC networks having a transfer characteristic which compensates for the differences in the distortion characteristics of said amplifier in said input amplifier stage and said auxiliary amplifier, whereby the distortion introduced due to the nonlinearity of said amplifier in said input amplifier stage is substantially reduced by feedforward cancellation.

* * * * *